United States Patent
Fux

(10) Patent No.: US 8,307,986 B2
(45) Date of Patent: Nov. 13, 2012

(54) MATERIAL SEPARATOR FOR DELIVERY SYSTEMS

(75) Inventor: Erhard Fux, Vienna (AT)

(73) Assignee: Wittmann Kunststoffgeraete GmbH, Vienna (AT)

( * ) Notice: Subject to any disclaimer, the term of this patent is extended or adjusted under 35 U.S.C. 154(b) by 271 days.

(21) Appl. No.: 12/682,507

(22) PCT Filed: Oct. 10, 2008

(86) PCT No.: PCT/AT2008/000368
§ 371 (c)(1),
(2), (4) Date: Apr. 9, 2010

(87) PCT Pub. No.: WO2009/046478
PCT Pub. Date: Apr. 16, 2009

(65) Prior Publication Data
US 2010/0236992 A1    Sep. 23, 2010

(30) Foreign Application Priority Data
Oct. 12, 2007  (AT) ................ A 1642/2007

(51) Int. Cl.
*B07B 9/00* (2006.01)

(52) U.S. Cl. .......... 209/22; 209/21; 209/12.1; 209/235; 209/240; 209/397

(58) Field of Classification Search ........... 209/12.1, 209/21, 22, 235, 397, 411; 141/67; 406/62
See application file for complete search history.

(56) References Cited

U.S. PATENT DOCUMENTS

| | | | | |
|---|---|---|---|---|
| 1,831,527 A * | 11/1931 | Dovidaitis | ............. | 210/265 |
| 2,463,137 A * | 3/1949 | Bahlke | ............. | 210/301 |
| 2,968,425 A * | 1/1961 | Paton | ............. | 406/90 |
| 3,351,390 A | 11/1967 | Dellsperger | | |
| 5,501,343 A * | 3/1996 | Hadden | ............. | 209/240 |
| 7,100,863 B2 * | 9/2006 | Hsu et al. | ............. | 242/566 |
| 7,819,253 B2 * | 10/2010 | Borger et al. | ............. | 209/373 |
| 2005/0205152 A1 * | 9/2005 | Nosaka | ............. | 141/67 |

FOREIGN PATENT DOCUMENTS

| | | |
|---|---|---|
| DE | 2535294 | 2/1977 |
| DE | 2748735 | 5/1979 |
| DE | 3936009 | 5/1991 |

(Continued)

*Primary Examiner* — Terrell Matthews
(74) *Attorney, Agent, or Firm* — Greenblum & Bernstein, P.L.C.

(57) ABSTRACT

The invention relates to a material separator for conveyor systems, in particular for machines processing plastics pellets. A container provided with a covering hood or a lid (2) is provided with a laterally arranged material feed connection (3) and a suction connection (4) arranged laterally above it as well as preferably a closure device (5) arranged at the lower end of the container (5). In the interior of the container (1) a screen (11) extending over the cross section of the container (1) is provided between the material feed connection (3) and the suction connection (4). The container (1) or the container upper edge (9) is beveled on the covering hood side or the lid side according to a flat cut. The screen (11) extends from the region between the material feed connection (3) and the suction connection (4) in the interior of the container in the direction of the lid (2) up to the region of the container upper edge (9) and is preferably bent in a roof-shaped manner. The screen (11) is connected to the lid (2).

15 Claims, 2 Drawing Sheets

FOREIGN PATENT DOCUMENTS

| | | |
|---|---|---|
| DE | 19528636 | 2/1995 |
| DE | 10313570 | 10/2004 |
| EP | 1508542 | 2/2005 |
| EP | 1568633 | 8/2005 |
| EP | 1588963 | 10/2005 |
| WO | 2006050361 | 5/2006 |

* cited by examiner

MATERIAL SEPARATOR FOR DELIVERY SYSTEMS

CROSS-REFERENCE TO RELATED APPLICATIONS

The present application U.S. National Stage of International Patent Application No. PCT/AT2008/000368 filed Oct. 10, 2008 and claims priority of Austrian Patent Application No. A 1642/2007 filed Oct. 12, 2007. Moreover, the disclosure of International Patent Application No. PCT/AT2008/000368 is expressly incorporated by reference herein in its entirety.

BACKGROUND OF THE INVENTION

1. Field of the Invention

The invention relates to a material separator for conveyor systems, in particular for machines processing plastics pellets, wherein a container provided with a covering hood or a lid with a laterally arranged material feed connection and a suction connection arranged laterally above it as well as preferably a closure device arranged at the lower end of the container is provided, and a screen extending over the cross section of the container is provided in the interior of the container between the material feed connection and the suction connection.

2. Discussion of Background Information

Material separators of this type are used in the plastics pellets processing industry to provide the pellets at the desired location, whether it is before the drying silo or before the machine processing the plastics pellets, such as, for example, an injection molding machine or an extruder. These material separators are thus used for the on-site provision of the material from the main material flow. In principle a distinction is made between overpressure conveying and vacuum conveying, wherein overpressure conveying is associated with the disadvantage that a compressed-air connection, that is, a compressed-air network, must be provided at each discharge location or discharge container. Conveying via a suction pump or vacuum pump is simpler in design.

Various devices for the pneumatic conveyance of bulk material are already known, thus, for example, from DE 103 13 570 A1. According to this device, pressure losses are offset by the use of orifice plates as flow limiters.

Furthermore, a device for conveying abrasive bulk material is known from EP 1 508 542 A2. Another method or device for the pneumatic conveyance of bulk material, in particular pelletized carbon black, is known from EP 1 588 963 A1.

A device for conveying and metering bulk material is known from DE 195 28 636 A1, wherein a conveyor line for the bulk material and a suction unit or pressure unit are connected to the metering container. With a device of this type, an additional conveyor device is superfluous.

DE 39 36 009 A1 describes a suction conveyor device in which the machine container at the same time forms the vacuum chute of the suction conveyor device.

Furthermore, a suction conveyor device for granular or powdery transported material, which has a separator container with a blower and filter cartridges, is known from DE 27 48 735 A1.

All of the above devices and appliances have in particular the disadvantage that they have a complicated structure through the accumulation of functions often stipulated.

A vacuum material separator is known from WO 2006/050361 A2, which has a container with a tilted container axis. For the tilted fixing of the container complex constructions in terms of mechanical engineering are provided, which have a definitely negative effect on the oscillatory behavior of the overall installation.

SUMMARY OF THE INVENTION

The present invention is directed to a material separator of the type cited at the outset, which on the one hand avoids the disadvantages described above and on the other hand exhibits the greatest possible modularity for a central conveyor system.

The invention is characterized in that the container or the container upper edge is beveled on the covering hood side or the lid side according to a flat cut, wherein the bevel of the container upper edge runs from the generator of the container through the or in the region of the connections to the diametric side or point, and the higher point of the bevel lies on the generator through the or in the region of the connections, and that the screen extends from the region between the material feed connection and the suction connection in the interior of the container in the direction of the lid up into the region of the container upper edge. With the invention it is possible for the first time to take into account the complex requirements for a material separator. The complete requirements range from complete tightness to abrasion resistance to the easy cleaning and maintenance of the device. The material separator according to the invention can be arranged in a perpendicular manner, whereby a very simple and stable attachment is possible. The beveling of the container upper edge ensures not only that it is visually unmistakable, but also that a maximum cross section and thus the easiest access for a thorough cleaning are achieved, which must be carried out in particular after every material change. Since a material change, depending on the application, is carried out very frequently in practice, an easy cleaning option is an essential criterion for a long-lasting and efficient use of the material separator.

According to a special embodiment of the invention, the container is a cylinder. This type of shaping of the container has proven very successful in practice, since it means that there are no corners for cleaning.

According to a special feature of the invention, the screen is bent, preferably in a roof-shaped manner, and one part extends from the region between the material feed connection and the suction connection in the interior of the container in the direction of the lid up to approximately the region of half the height of the beveled container upper edge, and the other part of the screen covers the remaining interior surface of the container. The region lying between the material feed connection and the suction connection is thus used optimally over the entire interior cross section of the container. The material, that is, in particular the plastics pellets, is suctioned out of the material feed connection via the suction connection. The suction air from the air/pellets mixture passes through the screen, is thus freed from the material and flows away via the suction connection.

According to a special embodiment of the invention, the screen is bent, preferably in a roof-shaped manner and one part extends from the region between the material feed connection and the suction connection in the interior of the container in the direction of the lid up to approximately the region of half the height of the beveled container upper edge, and the other part of the screen runs parallel to the covering hood or the lid. This special embodiment has the advantage that the scatter of the pellets coming from the material feed line can be influenced. A uniform distribution over the container cross section can thus be achieved.

According to a further special embodiment of the invention, the screen, in particular the part running parallel to the covering hood or the lid, is arranged with a spacing from the covering hood or the lid or a channel for guiding air is provided between the screen and the covering hood or the lid. The entire cross section of the interior of the container can thus be utilized for the air escape. The volume between the screen and the lid for the air discharge is not impaired.

According to a special feature of the invention, the screen is connected to the covering hood or the lid. The screen is connected to the covering hood or to the lid, whereby when the lid is opened, the screen is pivoted out of the interior region, or when the cover is closed, the screen is automatically guided into the correct position between the material inlet and the vacuum outlet. In addition to the easy handling of the device for cleaning, an important safety requirement is thus additionally met, since the operator, usually standing on the machine, does not have to handle any loose parts.

According to a further embodiment of the invention, the screen is an integral component of the the lid or the covering hood. In particular when the cover is connected undetachably to the screen, the above safety aspects are guaranteed on a lasting basis.

According to a further development of the invention, the covering hood or the lid is connected to the container via a detachable hinge. To clean the screen, the covering hood or the lid can simply be removed from the hinge and optionally treated with compressed air on the floor of the workshop.

According to one embodiment of the invention, the screen is produced from a stainless steel perforated lattice. The corresponding abrasion resistance is thereby ensured. Moreover, a thorough cleaning is easily possible.

According to a further special feature of the invention, the bevel of the container upper edge to the container central axis forms an angle of approximately 45 to 80°, preferably 50 to 60°. Through the establishment of this angle an optimal compromise between container volume and easy, convenient operation for cleaning the container can be achieved.

BRIEF DESCRIPTION OF THE DRAWINGS

The invention is explained in more detail based on exemplary embodiments that are shown in the drawing.

They show.

DETAILED DESCRIPTION OF THE PRESENT INVENTION

Figure 1:
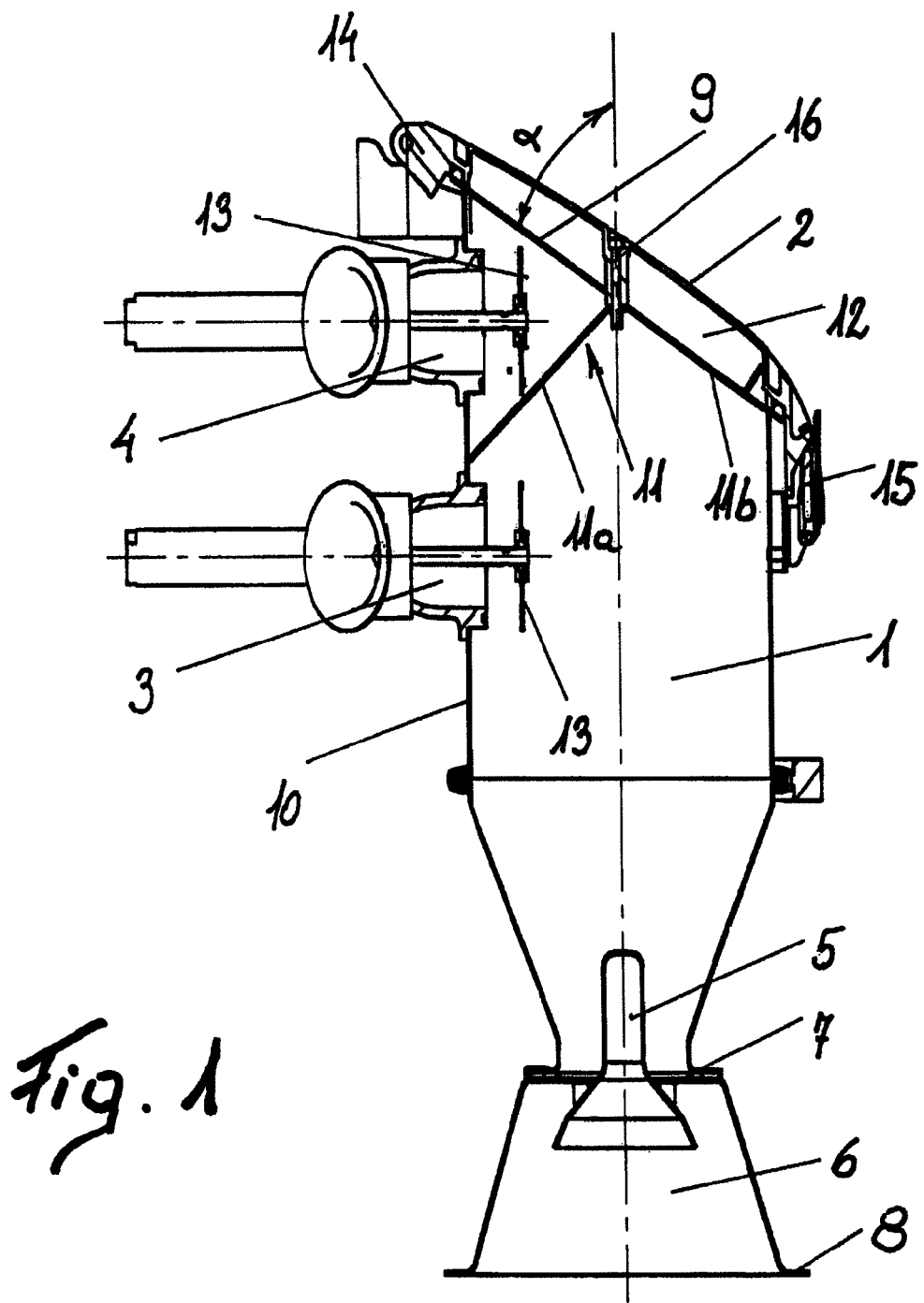
FIG. 1: A section through a material separator

According to FIG. 1, a material separator for conveyor systems, in particular for machines processing plastics pellets, is shown. The container 1 is embodied as a cylinder. The container 1 is provided with a covering hood or a lid 2. Furthermore, the container 1 has a laterally arranged material feed connection 3 and a suction connection 4 arranged laterally above it. A closure device 5 is provided at the lower end of the container 1.

The closure device 5 can be a conventional discharge flap or also a pneumatically actuated dome-shaped material discharge head.

The embodiment of the closure device 5 as a pneumatically actuated dome-shaped material discharge head has special advantages. Through an overriding control of this dome-shaped material discharge head, differences in the atmospheric pressure between the inner container of the material separator and the discharge cone do not have any effect on the function of the device. This also eliminates the necessity of a filter insert in the cone, which has to be cleaned at a material change.

Furthermore, this material separator can optionally also be equipped with a triple screened, capacitive level indicator (not shown) in order to avoid the programming and incorrect input of loading times.

The material separator has on its lower end of the container 1 a bell-shaped mounting base 6, with which a secure and stable mounting of the container 1 to a machine is possible. The container 1 is mounted on the mounting base 6 with a flange connection 7. Furthermore, the mounting base 6 is mounted on the machine again with a flange connection 8.

The container 1 or the container upper edge 9 thereof is beveled according to a flat cut on the covering hood side or lid side. The bevel of the container upper edge 9 runs from the generator 10 of the container 1 through the or in the region of the connections 3, 4 to the diametric side or point, wherein the higher point of the bevel lies on the generator through the or in the region of the connections 3, 4. The bevel of the container upper edge 9 to the container central axis forms an angle α of approximately 40 to 75°, preferably 50 to 60°.

A screen 11 extending over the cross section of the container 1 is provided in the interior of the container 1 between the material feed connection 3 and the suction connection 4. The screen 11 extends from the region between the material feed connection 3 and the suction connection 4 in the interior of the container in the direction of the lid 2 up into the region of the container upper edge 9.

The screen 11 is bent, preferably in a roof-shaped manner, wherein one part 11a extends from the region between the material feed connection 3 and the suction connection 4 in the interior of the container in the direction of the lid 2 up to approximately the region of half the height of the beveled container upper edge 9 and the other part 11b of the screen 11 covers the remaining interior surface of the container. In particular it is advantageous if the other part 11b of the screen 11 runs parallel to the covering hood or the lid 2 and the part 11b running parallel to the covering hood or the lid 2 is arranged with a spacing from the covering hood or from the lid 2, or a channel 12 for guiding air is provided between the screen 11 and the covering hood or the lid 2.

The screen 11 is connected to the covering hood or the lid 2, for example via a threaded connection 16, or is an integral component of the covering hood or the lid 2.

The material separator can be designed right from its planning for the largest possible modularity. The material feed connection 3 and the suction connection 4 arranged above it can be adapted in the simplest manner to different diameters of the material lines or suction lines. With the aid of a modular system that is composed of three different diameters and center cylinder segments adapted thereto, the best conveyor device can be designed for every desired throughput. Devices of this type are suitable for individual lines as well as for collection lines with metering gates.

Stationary seal rings 13 are provided in the interior of the container in the region of the inlets of the material feed connection 3 and the suction connection 4, which stationary seal rings close the inlets when no material is being conveyed.

The lid 2 on the one hand is connected to the container 1 via a detachable hinge 14 and on the other hand has on its diametric point a clamping lever closure 15, which in its closed position ensures the tightness of the lid 2 and container 1.

Figure 2:
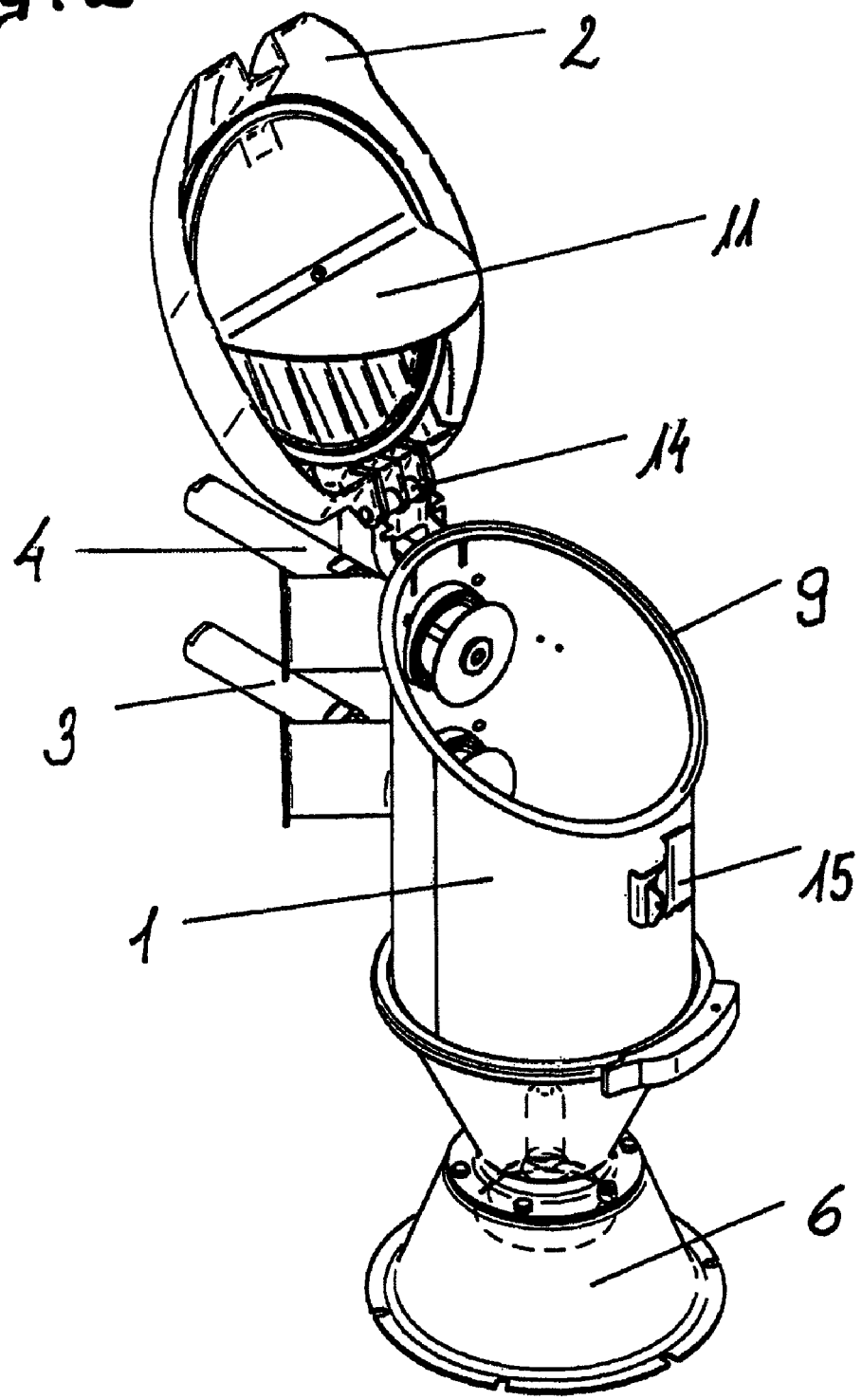
FIG. 2: An isometric representation of the material separator with opened lid.

The safe and convenient handling during the cleaning of the material separator is shown according to FIG. 2. As already indicated, the material separator is composed of the container 1 with its container upper edge 9 running in a tilted manner which on the lower end of the container 1 has a mounting base 6, for example, for the mounting on a machine. The material feed connection 3 and the suction connection 4 are arranged laterally. The lid 2 is provided to close the container 1.

To clean the interior of the container, the lid 2 is opened by releasing the clamping lever closure 15. When the lid 2 is opened, the screen 11 is unfolded from its position in the interior of the container, since the screen is connected to the lid 2 and is an integral component of the lid 2.

Since material separators of this type are usually arranged very high at their location of use, the operator usually stands on a ladder and reaches in the interior of the container to clean the container, the beveled container upper edge 9 renders possible an optimal compromise between container volume and simple, convenient operation for cleaning the container 1.

To clean the screen 11, the lid 2 can be removed via the detachable hinge 14 and the screen 11 can be subjected to a thorough cleaning at a suitable point.

In this representation of the material separator, the bent screen 11 is also clearly shown. In the closed condition of the lid 2, it is in its position for its function of separating the suction air from the air flow loaded with pellets. If the lid 2 is closed, the screen 11 is automatically in its correct position.

This material separator disclosed thus meets the requirements set, with respect to tightness and abrasion resistance as well as in particular to easy cleaning. In particular the easy cleaning, which takes into consideration the safety aspects, is an important criterion for a long-lasting and efficient use.

The invention claimed is:

1. A material separator for conveyor systems, comprising:
a container comprising:
   an upper edge, a lower end, and an interior;
   a covering hood or a lid;
   a laterally arranged material feed connection and a suction connection;
   the suction connection arranged laterally above the material feed connection; and
   a closure device arranged at the lower end;
   a screen extending over a cross section of the container and having a portion extending into an area of the interior between the material feed connection and the suction connection;
   one of:
     the container or the container upper edge having a bevel extending from a generator of the container through or into a region of the material feed and suction connections to a diametric side or point, such that a higher point of the bevel lies on the generator;
     the upper edge being beveled so that one portion of the upper edge is arranged axially above the suction feed connection and another portion of the upper edge is axially arranged between the suction feed connection and the material feed connection; and
   the screen extending from the region in the interior between the material feed connection and the suction connection in the direction of the covering hood or lid up into a region of the upper edge.

2. The material separator in accordance with claim 1, wherein the conveyor systems include machines processing plastics pellets.

3. The material separator in accordance with claim 1, wherein the container is a cylinder.

4. The material separator in accordance with claim 1, wherein the screen is bent and includes one part extending from the interior region between the material feed connection and the suction connection in the direction of the covering hood or lid up to approximately a region of one-half a height of the beveled upper edge, and an other part covering a remaining interior surface of the container.

5. The material separator in accordance with claim 4, wherein the screen is bent in a roof-shaped manner.

6. The material separator in accordance with claim 1, wherein the screen is bent, an includes one part extending from the interior region between the material feed connection and the suction connection in the direction of the covering hood or lid up to approximately a region of one-half a height of the beveled upper edge, and an other part running parallel to the covering hood or lid.

7. The material separator in accordance with claim 6, wherein the screen is bent in a roof-shaped manner.

8. The material separator in accordance with claim 1, wherein the screen includes a part running parallel to the covering hood or lid that is spaced from the covering hood or the lid.

9. The material separator in accordance with claim 1, further comprising a channel for guiding air formed between the screen and the covering hood or lid.

10. The material separator in accordance with claim 1, wherein the screen is connected to the covering hood or lid.

11. The material separator in accordance with claim 1, wherein the screen is an integral component of the covering hood or lid.

12. The material separator in accordance with claim 1, further comprising a detachable hinge, wherein the covering hood or lid is connected to the container via the detachable hinge.

13. The material separator in accordance with claim 1, wherein the screen is produced from a stainless steel perforated lattice.

14. The material separator in accordance with claim 1, wherein the bevel of the upper edge relative to a container central axis forms an angle ($\alpha$) of approximately 40 to 75°.

15. The material separator in accordance with claim 14, wherein the bevel forms an angle ($\alpha$) of approximately 50 to 60°.

\* \* \* \* \*